US006218785B1

United States Patent
Incerti

(10) Patent No.: US 6,218,785 B1
(45) Date of Patent: Apr. 17, 2001

(54) LOW-TENSION LIGHTING DEVICE

(75) Inventor: Edda Incerti, Casina (IT)

(73) Assignee: Incerti & Simonini di Incerti Edda & C. S.n.C., Reggio Emilia (IT)

( * ) Notice: Subject to any disclaimer, the term of this patent is extended or adjusted under 35 U.S.C. 154(b) by 0 days.

(21) Appl. No.: 09/272,047

(22) Filed: Mar. 19, 1999

(51) Int. Cl.⁷ .................................................. H05B 37/00
(52) U.S. Cl. .................... 315/185 S; 315/57; 315/200 A; 313/634; 362/307
(58) Field of Search ................... 315/57, 185 S, 315/200 A, 291, 307, 306, 209, 32, 112, 118, 225; 313/634, 512, 312, 318.01; 362/307, 311

(56) References Cited

U.S. PATENT DOCUMENTS

| | | | |
|---|---|---|---|
| 4,074,165 | * 2/1978 | Morijama | 313/112 |
| 4,675,575 | 6/1987 | Smith et al. | 315/185 S |
| 4,816,977 | * 3/1989 | Sorensen | 362/448 |
| 5,239,255 | * 8/1993 | Schanin et al. | 323/237 |
| 5,325,271 | 6/1994 | Hutchisson | 362/32 |
| 5,363,020 | * 11/1994 | Chen et al. | 315/209 R |
| 5,382,882 | * 1/1995 | Nerone | 315/307 |
| 5,434,478 | * 7/1995 | Kovalsky et al. | 315/209 R |
| 5,442,258 | 8/1995 | Shibata | 315/129 |
| 5,495,147 | 2/1996 | Lanzisera | 315/185 |
| 5,506,760 | * 4/1996 | Giebler et al. | 362/249 |
| 5,561,346 | * 10/1996 | Byrne | 313/512 |
| 5,585,783 | * 12/1996 | Hall | 340/473 |
| 5,655,830 | * 8/1997 | Ruskouski | 362/240 |
| 5,726,535 | * 3/1998 | Yan | 315/185 R |
| 5,751,120 | * 5/1998 | Zeitler et al. | 315/307 |
| 5,757,630 | * 5/1998 | Lesea | 363/39 |
| 5,850,126 | * 12/1998 | Kanbar | 315/200 A |
| 5,924,784 | * 7/1999 | Chliwnyj et al. | 362/234 |
| 5,964,051 | * 10/1999 | Loeber et al. | 40/570 |
| 6,026,602 | * 2/2000 | Grondal et al. | 40/570 |

FOREIGN PATENT DOCUMENTS

| | | |
|---|---|---|
| 2925692 | 1/1980 | (DE) . |
| 3832109 | 3/1990 | (DE) . |
| 0876085 | 11/1998 | (EP) . |
| 2586844 | 3/1997 | (FR) . |
| 9602970 | 2/1996 | (WO) . |

* cited by examiner

Primary Examiner—Don Wong
Assistant Examiner—Tuyet T. Vo
(74) Attorney, Agent, or Firm—Browdy and Neimark

(57) ABSTRACT

The low-tension lighting device is provided with at least one LED (2) having a control circuit (3) which governs functioning thereof and which is connected to a coupling element, for example a screw-type coupling element (4), by means of which the device (1) is insertable in a lamp-holder of known type. The LED (2) is protected by a body (8) also functioning as a uniform diffusor of light emitted by the LED (2). The device (1) can be used to substitute low tension filament lamps for illumination in cemeteries.

12 Claims, 2 Drawing Sheets

LOW-TENSION LIGHTING DEVICE

TECHNICAL FIELD OF THE INVENTION

1. Background of the Invention

The present invention relates to a low-tension illumination device. Specifically, though not exclusively, it is useful in cemetery-type or other monument lighting, where illumination has a symbolic value and should be able to continue at length but with low consumption.

2. Prior Art

Various types of incandescent lamps are already in use for this type of application, all of which have limits and drawbacks. Firstly, they are of limited duration, in the region of a few thousand hours, and give a fairly low-level performance. Secondly, they are of poor reliability, especially due to the delicate nature of the filament.

In particular the invention relates to a low-tension lighting device comprising a LED and a control circuit governing LED functioning.

Various types of LED lighting device are known, all of which can be improved. Firstly, they have the problem of scattering the light from the LED in a wide area around it. Secondly, they have the problem of protecting the LED from voltage and current transients is and the problem of stabilising the LED light output.

U.S. Pat. No. 5,442,258 discloses a LED lamp device comprising an adapter for mounting on one end thereof a LED emitter, a base being fixed to the other end of the adapter. The lighting parts, such as a constant-voltage diode, are contained inside the adapter and the base.

In U.S. Pat. No. 5,325,271 a lamp assembly includes a multifaceted prismatic diffuser to which a number of LEDs are fitted. When the LEDs are energized, the light emitted thereby is initially diffused throughout all of the diffuser. It is then emitted from facets forming the outer portion of the diffuser such that it can be seen over a wide viewing angle.

The light string system of U.S. Pat. No. 4,675,575 has a plurality of LEDs electrically connected thereto. Each LED has a generally elongate, hollow envelope mounted over it, and the envelope is substantially filled with light-conducting optical spheres or fragments.

DE 3832109 discloses a light fitting for rear lamp of bicycle including a series regulating unit for switching LEDs on and off according to fluctuating supply voltage. A light fitting housing encloses the light source and its holder. At least one wall of the housing is transparent and with a connection for coupling the light source to the electric power source, usually the bicycle dynamo. A LED array is provided as the light source. At least one single colour LED is used for the array. The transparent wall is designed neutrally transparent and between the electric power source and the arrangement of LEDs a voltage responsive regulating unit is arranged. The regulating unit includes a current regulator connected in the circuit of the LED array. The rear lamp has a pure red light so that no filter is necessary.

The light string system of U.S. Pat. No. 5,495,147 includes a plurality of LEDs connected in parallel and a regulated power supply for providing a constant current and a constant voltage to the LEDs.

FR 2586844 discloses a traffic signal lamp wherein an array of LEDs are mounted on a plate in the form of a printed circuit board which is mounted with its plane perpendicular to the optical axis of the lamp. The diodes are supplied from a mains rectifier mounted in the base of the lamp beneath the printed circuit board. The assembly is housed in a transparent shell serving as a diffuser, and the shell is fed to a base terminating in a conventional Edison screw or bayonet contact lamp base.

In DE 2925692 an illuminated road sign has symbols formed of clusters of LEDs with several series groups connected in parallel to provide low power consumption and high reliability. The diodes are connected as diodes groups in series, with the groups coupled in parallel. The circuit operates with current limiting and a rectifier stage for the supply. WO 96/02970 discloses an inductively powered lamp unit using an inductive power pick up comprising a resonant circuit The induced current circulating in the resonant circuit is limited to a maximum value by a shorting switch controlled by a comparator that compares the sensed current with a reference value. Power is supplied to LEDs.

The main aim of the present invention is to provide an illumination device which is able to obviate the limits and drawbacks in the prior art.

SUMMARY OF THE INVENTION

A low-tension lighting device according to the present invention comprises a control circuit governing functioning of the LED, and a coupling element which is connected to the control circuit and by means of which the device is couplable to a lamp holder.

An advantage of the present invention is to provide a device which can substitute for those lamps currently in use without having substantially to modify the lampholders and illumination plants in use in cemeteries.

Further advantages are that consumption is relatively low, duration and efficiency and reliability are much improved, and there is a significant energy saving with respect to the amount of light emitted.

These aims and advantages are all attained by the invention as it is characterised in the claims that follow.

BRIEF DESCRIPTION OF THE DRAWINGS

Further characteristics and advantages of the present invention will better emerge from the detailed description that follows of a preferred but nonexclusive embodiment of the invention, illustrated purely by way of a non-limiting example in the accompanying figures of the drawings, in which.

DETAILED DESCRIPTION OF PREFERRED EMBODIMENTS

Figure 1:
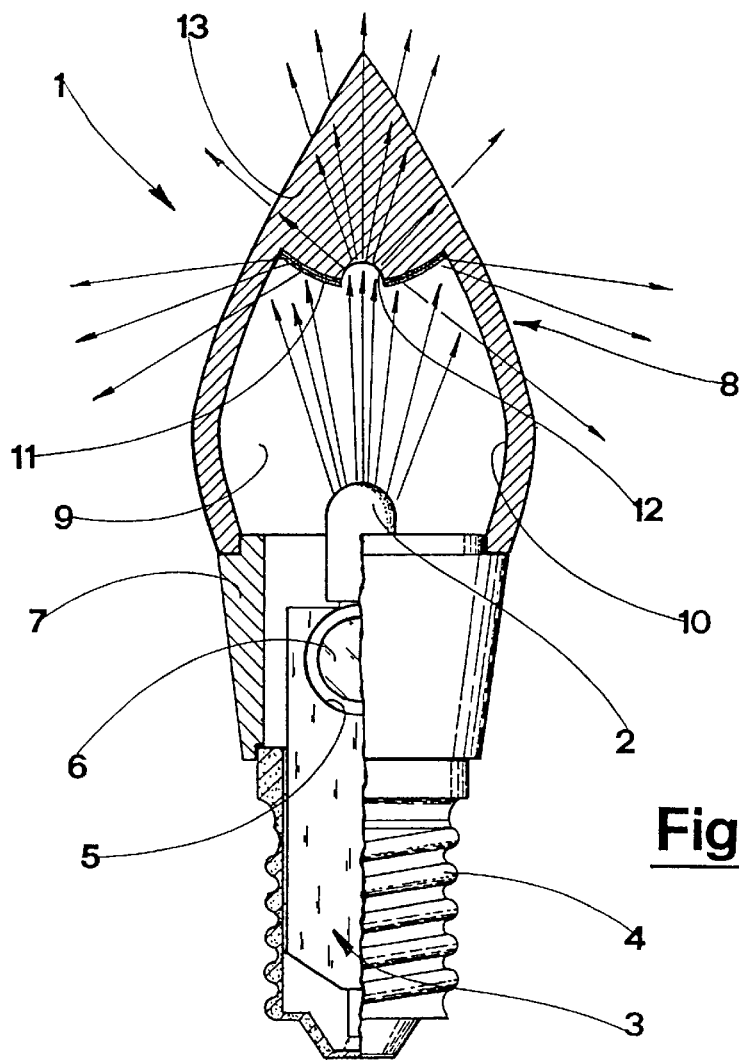
FIG. 1 shows a schematic section of the device.

With reference to the above-mentioned figures, 1 denotes in its entirety a low-tension illumination device comprising a light source composed of one or more LEDs 2, a control circuit 3 which controls the LED 2, and a coupling element, in the example a screw base 4, with which the device can be inserted in a lamp socket of known type and not illustrated. The control circuit 3 of the LED 2 is a printed circuit, having a main body which is substantially rectangular, and which is conformed and of such dimensions as to be insertable in the screw base 4, which reduces the overall mass of the device 1. The printed circuit 3 further exhibits, superiorly, a hollow seat 5 for housing an electrolytic condenser 6, which condenser 6 is arranged with its geometric axis perpendicular to the printed circuit 3. The upper end of the printed circuit also functions as a support for the LED 2. An adaptor ring 7 is constrained by its lower end to the upper end of the screw base 4. The upper part of the printed circuit 3 is housed internally of the adaptor ring 7. The adaptor ring 7 is made of white plastic (for example, ABS or nylon) and exhibits a surface finishing such as to diffuse the light evenly. With the same aim of diffusing the light evenly, the printed circuit 3 is fixed using white epoxy resin, which doubles as waterproofing. A body 8 is constrained to the upper end of the ring 7 to protect the LED 2 and to diffuse the light emitted by the LED 2 evenly - since the light emitted is, in fact, emitted in a preferred direction. The body 8 is effectively a diffusion filter, thanks to which (as will be better explained hereinbelow) the light emitted from the device is omnidirectional, emulating incandescent lamps.

The diffusor body 8 is hollow, inferiorly open and exhibits externally a flame shape. It is provided with walls which internally describe a chamber 9 housing the LED 2.

The diffusor body 8 is made of a light-transparent material, such as, for example, a polycarbonate. In any case, preferably the body 8 material is highly translucent (for example, more than 85%), low in opalescence (for example, less than 2%) and has a refraction index comprised between 1.4 and 1.6.

The LED 2 emits a light beam having a limited angular breadth and substantially upwards-directed (see FIG. 1), i.e. in a direction towards the wall superiorly delimiting the chamber 9 described by the diffusor body 8.

The chamber 9 is laterally delimited by a shiny circumferential surface 10 (very translucent) and superiorly delimited by a reflecting diffusor surface 11, is convex in shape, whitened, and able to reflect and diffuse the greater part of the light which hits it. The convex 11 surface is obtained, for example, through electron discharge machining, followed by a white painting operation. The whitened surface 11, arranged so as to be struck directly by the greater part of the light emitted by the LED 2, exhibits at its centre a small concave zone 12 which is not whitened but rather shiny, which zone 12 is struck by a part of the light emitted by the LED 2. The upper part (13) of the diffusor body 8, in which the abovementioned shiny concave zone 12 is afforded, is considerably thickened. The light hitting the concave zone 12 passes through the upper thickened part 13, refracting as it does so and expanding both upwards and radially. The part of the light beam emitted by the LED which strikes the diffusing surface 11 is then reflected by said surface 11 and diffused so as to expand both downwards and radially. The overall action of the diffusor body 8 is therefore to diffuse the light from the LED 2 (which arrives monodirectionally) all about.

In the example of FIG. 1, both the whitened convex surface 11 and the shiny concave zone 12 (which is smaller) are spherically cap-shaped, with their centres on the optical axis of the light source or LED 2. Experiments have shown that this conformation enables the light from the LED 2 to be diffused more or less uniformly, similarly to how a common light filament works. However, both the shape and sizes of the various elements making up the diffusor body 8, in particular the whitened convex body 11, the concave shiny zone 12 and the upper thickening 13, as well as the distance of these elements from the light source 2, can be different from the illustrated example, according to various parameters, such as for example the type and number of the light sources used, the type of light effect required, and so on.

Figure 2:
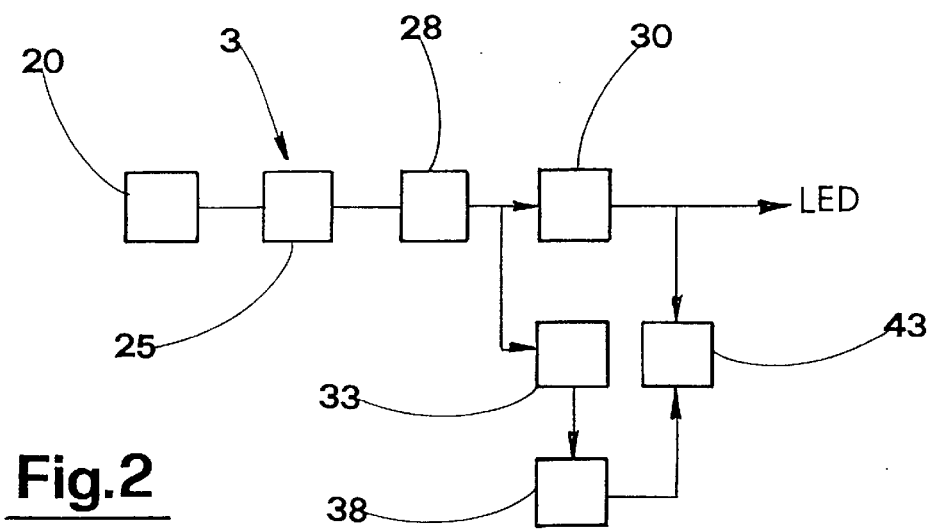
FIG. 2 is a block diagram of the control circuit of the device.
Figure 3:
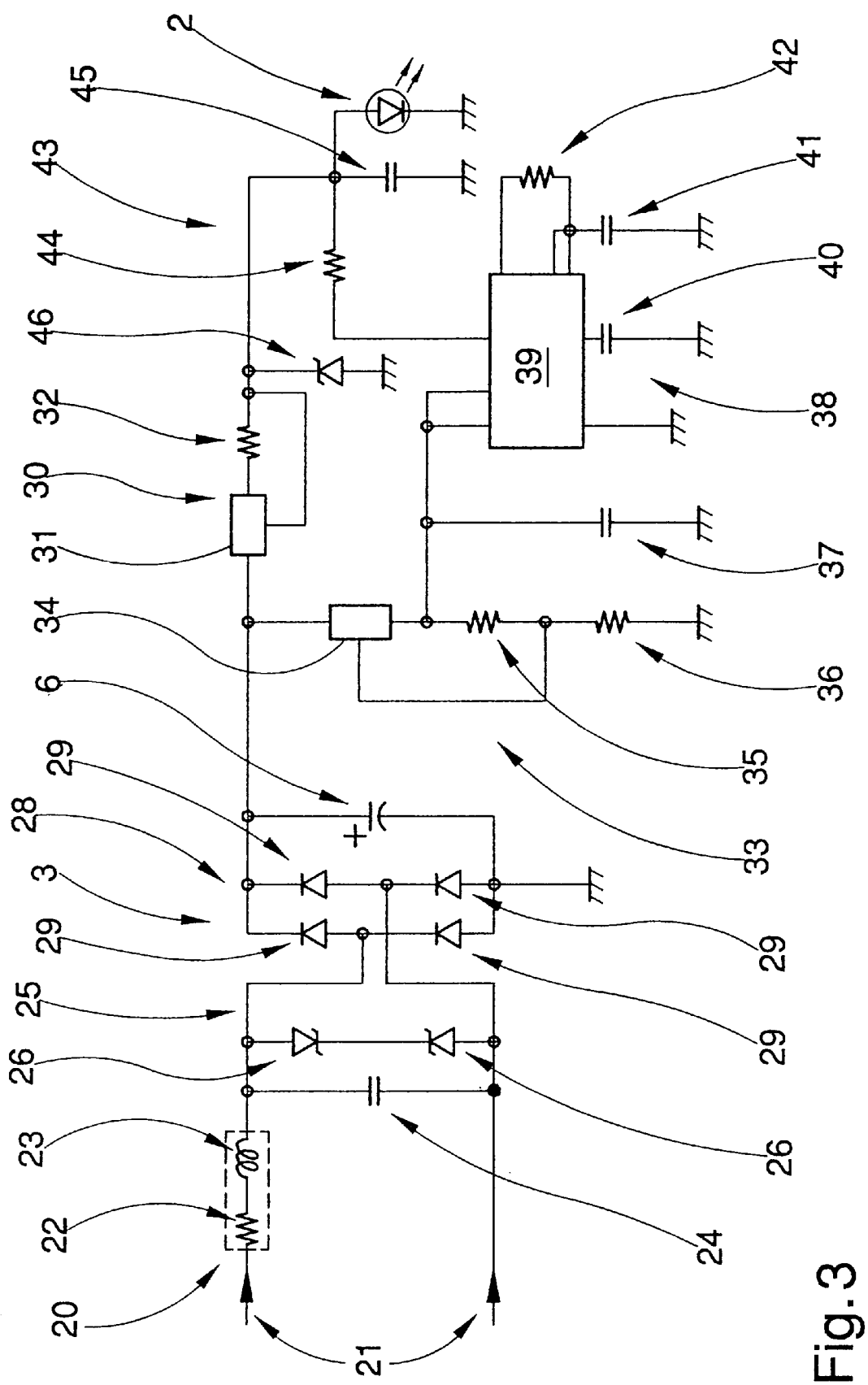
FIG. 3 is the electrical diagram of the circuit of FIG. 2.

FIGS. 2 and 3 show, respectively, the block diagram and the electrical diagram of the LED 2 control circuit 3.

20 denotes a first circuit stage functioning as an input protection in relation to the supply terminals 21. The first circuit stage 20 comprises an RLC filter to block radio-frequency signal. The RLC filter comprises a first resistor 22, metallic and ⅛ W resistance, which also carries out the function of connector to a supply terminal (central electrode) and also functions as a safety fuse on the supply line. The RLC filter further comprises an inductor 23 which is parasitic to the resistor 22, and a 1000 pF capacitor 24.

25 denotes a second circuit stage or block, which functions as a bipolar suppressor of transients and is composed of two zener diodes 26 and 27 connected in opposition.

The overload limiter action is facilitated by the resistor 22 of the first stage 20. 28 denotes a double half-wave rectifier with Graetz bridge constituted by four 150 mA /100 V Schotky diodes 29 so that a small voltage drop (0.8 V) is achieved, and by the above-mentioned 100 $\mu$F/35 V electrolytic condenser 6.

Minimalisation of the residual ripple in a.c. functioning is guaranteed by the sum of the equivalent resistances of the diodes in direct conduction and by the resistor 22 together with the electrolytic condenser (RC filter).

30 denotes a constant current (26.7 mA) regulator stabilizer stage for piloting the LED 2, the main task of which is to avoid electrical and thermal overloads in the LED 2 so that the latter enjoys a long working life and is thoroughly reliable. The regulation stage 30 comprises an integrated circuit 31 and a resistor 32. The integrated circuit 31 is of the LM317L type and configured as a constant-current generator able to guarantee optimal operativity for input voltages comprised between 4.8 V and 43 V. The integrated circuit 31 is provided with internal protections against electrical and thermal overload. To avoid the intervention of the thermal overload protection during normal operation, an adequate electrical connection area is allowed for on the integrated circuit 3 to improve heat dissipation through an added heat dissipator.

33 denotes a constant-tension stabilising stage for supplying the flashing circuit. This stage 33 comprises a further integrated circuit 34, of the LM317L type, used in the constant tension (3 V) generator configuration, where the output tension is maintained at the nominal value for an input tension excursion comprised between 4.8 V and 43 V. The stabilising stage 33 further comprises two resistors 35 and 36 and a capacitor 37.

38 indicates an oscillating stage for the flashing function, made by using a CMOS TIMER LMC555 integrated circuit 39 in the non-stable multivibrator configuration (rectangular wave oscillator) for which a circuit variation has been made in relation to the standard configuration, which enables a smaller number of external components to the obtained as well as the integration of the sink-driver function. This oscillating phase 38 comprises at least two capacitors 40 and 41 and a resistor 42. 43 denotes an extinguishing circuit of the LED 2, known as a sink-driver, made by means of the above-mentioned integrated circuit 39 through the pin called the opendain-n. 7 of the integrated circuit itself, together with a resistor 44 and a capacitor 45, indicated in FIG. 3.

The control circuit 3 can be supplied at low tension, and more precisely at a voltage comprised between about 5.6 V and 26 V, either in direct or alternated current. The circuit 3 can operate in d.c. with automatic polarity and has a protection for the device supply line in case of circuit failure, as well as a protection on the supply input against transitory overloads (stage 25 of the circuit).

The circuit 3 enables a constant drive current to be supplied to the LED 2 when the actual supply voltage is subject to variation, giving reliability and good service duration times. The LED 2 can also emit a fixed light or an intermittent light (through stage 38).

During flashing phases residual light can be used to achieve special optical effects, such as candlelight.

The circuit 3 also includes a zener diode 46 for protecting the LED 2 diode during the assembly phase.

It is worth stressing that the flashing function enables absorption of a constant current with a variation of light emission. This prevents problems associated with electromagnetic incompatibility which can obtain in the presence of loads which are sharply variable, especially when there are considerable numbers of points to be illuminated. Further, the electronic drive circuit gives rise to a universal supply system, both in d.c. and a.c., low tension, able if necessary to adapt to an unconventional supply type (photovoltaic or wind-generated).

A further advantage of the device is that is provides a constant light emission even in the presence of a variation in the supply voltage (within the envisaged limits of 6–24 V). This means, for example, that a same light level can be achieved at all illumination points distributed along the electrical supply line, and prevents there being variations in light levels depending on certain operative conditions in the cemetery illumination plant. With respect to incandescent lamps, the device of the invention gives a considerable energy saving (it can function at 0.2 W and 6 W), lasts longer (more than 100,000 hours of service), as well as better reliability (the time between two breakdowns is calculated at more than 50,000 functioning hours).

Coupling to the lamp holder can be achieved in various ways, as the attachment itself can be made to correspond with the necessary type for the individual holder. The connection could be of the bayonet type, or the screw type (as in the illustrated embodiment), or whatever is needed.

The device of the invention is particularly useful for substituting low tension filament lamps used in cemetery or monument illumination.

The device can simulate a candle effect, thanks to the residual light during the flashing phase.

The device is very compact, thanks in part to the fact that the majority of the printed circuit 3 (more than two-thirds) is housed in a hollow seating internal of the screw base 4.

What is claimed is:

1. A low-tension lighting device comprising:
   a first base adapted for engagement to a lamp holder;
   a shaped printed control circuit connected to said base;
   an adapter ring engaged to said base;
   parts of said printed control circuit respectively extending into said base and said adapter ring;
   at least one LED engaged to and supported by said printed control circuit and extending in part into said adapter ring;
   a translucent body having an internal chamber and a second open base engaged to and supported by said adapter ring;
   said at least one LED extending in part into said internal chamber;
   wherein an axis of said internal chamber is coaxial with an optical axis of the LED;
   wherein the translucent body includes a concave transparent wall portion around the axis of said internal chamber;
   wherein a portion of the translucent body adjacent to the transparent wall portion is convex toward the LED and whitened and
   wherein a wall thickness of the translucent body along the axis of the internal chamber and above the convex and concave portions of the translucent body is greater than that of other wall portions of the translucent body.

2. A low-tension lighting device according to claim 1, wherein an external shape of the translucent body is flame shaped.

3. The device of claim 1, wherein the control circuit comprises; a circuit stage functioning as an input protection; a circuit stage functioning as a suppressor of voltage transient interferences; a circuit stage functioning as a double half-wave rectifier; a circuit stage functioning as a constant current regulator for preventing LED electrical and thermal overload; a circuit stage functioning as a constant voltage stabilizer for supply to a flashing circuit; a circuit stage functioning as an oscillator for flashing function; and a circuit stage functioning as a circuit breaker for the LED.

4. A low-tension lighting device according to claim 1, wherein the transparent portion wall facing the LED is concave away from the LED.

5. A low-tension lighting device according to claim 4, wherein the transparent wall portion facing the LED is spherically shaped.

6. A low-tension lighting device comprising:
   a first base adapted for engagement to a lamp holder;
   a printed control circuit connected to said base;
   a translucent body having an internal chamber and a second open base engaged to and supported by said first base;
   at least one LED engaged to and supported by said printed control circuit and extending into said internal chamber;
   wherein an axis of said internal chamber is coaxial with an optical axis of the LED;
   and wherein the translucent body includes a concave transparent wall portion around the axis of said internal chamber and a convex wall portion adjacent to the transparent wall portion, a wall thickness of the translucent body along the axis of the internal chamber and above the convex and concave portions of the translucent body being greater than that of other wall portions of the translucent body.

7. A low-tension lighting device according to claim 6, further comprising an adapter ring engaged to said base;
   parts of said printed control circuit respectively extending into said base and said adapter ring.

8. A low-tension lighting device according to claim 6, wherein an external shape of the translucent body is flame shaped.

9. The device of claim 6, wherein the control circuit comprises; a circuit stage functioning as an input protection; a circuit stage function as a suppressor of voltage transient interfaces; a circuit stage functioning as a double half-wave rectifier; a circuit stage functioning as a constant current regulator for preventing LED elect and thermal overload; a circuit stage functioning as a constant voltage stabilizer for supply to a flashing circuit, a circuit stage functioning as an oscillator for flashing function; and a circuit stage functioning as a circuit b for the LED.

10. A low-tension lighting device according to claim 6, wherein the transparent portion wall facing the LED is concave away from the LED.

11. A low-tension lighting device according to claim 10, wherein the transparent wall portion facing the LED is spherically shaped.

12. A low-tension lighting device according to claim 10, wherein the portion of the translucent body adjacent to the transparent wall portion is convex toward the LED and whitened.

* * * * *